United States Patent
Kappes et al.

(10) Patent No.: US 7,751,547 B2
(45) Date of Patent: Jul. 6, 2010

(54) EXTENDING A CALL TO A TELECOMMUNICATIONS TERMINAL THROUGH AN INTERMEDIATE POINT

(75) Inventors: Martin Kappes, Frankfurt am Main (DE); Parameshwaran Krishnan, Basking Ridge, NJ (US)

(73) Assignee: Avaya Inc., Basking Ridge, NJ (US)

( * ) Notice: Subject to any disclaimer, the term of this patent is extended or adjusted under 35 U.S.C. 154(b) by 899 days.

(21) Appl. No.: 11/121,677

(22) Filed: May 4, 2005

(65) Prior Publication Data

US 2006/0210049 A1    Sep. 21, 2006

Related U.S. Application Data

(63) Continuation-in-part of application No. 11/080,866, filed on Mar. 15, 2005.

(51) Int. Cl.
*H04M 3/42* (2006.01)
(52) U.S. Cl. .............................. 379/211.02; 379/212.01
(58) Field of Classification Search ............ 379/221.14, 379/233, 234, 245, 246, 211.02, 212.01
See application file for complete search history.

(56) References Cited

U.S. PATENT DOCUMENTS

| | | | |
|---|---|---|---|
| 6,748,071 B2 | 6/2004 | Milton | |
| 6,751,309 B2 | 6/2004 | Milton | |
| 6,760,420 B2 | 7/2004 | Heilmann et al. | |
| 6,763,102 B1 * | 7/2004 | Chen et al. | 379/221.15 |
| 2002/0049915 A1 * | 4/2002 | Yasushi et al. | 713/202 |
| 2003/0217165 A1 | 11/2003 | Buch et al. | |
| 2004/0109541 A1 | 6/2004 | Celi, Jr. et al. | |

FOREIGN PATENT DOCUMENTS

| | | |
|---|---|---|
| EP | 1100248 A2 | 5/2001 |
| EP | 1427163 A2 | 6/2004 |
| GB | 2397731 A | 7/2004 |
| WO | 01/13243 A1 | 2/2001 |
| WO | 01/67219 A1 | 9/2001 |

OTHER PUBLICATIONS

William J. Deane Jr., "U.S. Appl. No. 11/080,866 Office Action", Oct. 8, 2008, Publisher: USPTO, Published in: US.
William J. Deane, Jr., "U.S. Appl. No. 11/080,866 Office Action", Feb. 5, 2009, Publisher: USPTO, Published in: US.
William J. Deane, Jr., "U.S. Appl. No. 11/080,866 Office Action Jan. 22, 2010", , Publisher: USPTO, Published in: US.
Deane Jr., William J., "U.S. Appl. No. 11/080,866 Office Action Jul. 14, 2009", , Publisher: USPTO, Published in: US.

* cited by examiner

*Primary Examiner*—Ahmad F Matar
*Assistant Examiner*—Antim Shah
(74) *Attorney, Agent, or Firm*—DeMont & Breyer, LLC

(57) ABSTRACT

A method and apparatus are disclosed that enable a call-processing server to extend a received call out to a telecommunications terminal endpoint, wherein the terminal, such as a hotel room phone, is local to and accessible only through an intermediate point, such as a hotel switchboard. Also disclosed are a method and apparatus that enable a data-processing system, such as a server, to determine whether or not to grant a telecommunications terminal endpoint one or more privileges, without some of the disadvantages of the prior art. The methods and apparatus that are taught in this disclosure can be used for extending the incoming call to the endpoint independently of or in the absence of determining whether or not to grant privileges to the endpoint.

20 Claims, 9 Drawing Sheets

EXTENDING A CALL TO A TELECOMMUNICATIONS TERMINAL THROUGH AN INTERMEDIATE POINT

CROSS REFERENCE TO RELATED APPLICATIONS

This application is a continuation-in-part of: U.S. patent application Ser. No. 11/080,866, filed on 15 Mar. 2005, entitled "Granting Privileges to a Telecommunications Terminal Based on the Relationship of a First Signal to a Second Signal," now pending, which is also incorporated herein by reference.

FIELD OF THE INVENTION

The present invention relates to telecommunications in general, and, more particularly, to extending a call to a telecommunications through an intermediate point.

BACKGROUND OF THE INVENTION

FIG. 1 depicts a block diagram of telecommunications system 100 in the prior art. Telecommunications system 100 comprises: designating telecommunications terminal 101, designated telecommunications terminal 102, call-processing server 103, telecommunications network 104, telecommunications terminal 105, and telecommunications terminals 109 and 110, interconnected as shown.

Designating telecommunications terminal 101 is a personal computer (e.g., a laptop, etc.) that runs software that enables the terminal to provide telecommunications services to its user by transmitting and receiving packets of information. In this capacity, terminal 101 can be referred to as a softphone. Some of the telecommunications services that terminal 101 provides include placing and receiving calls, emailing, instant messaging, and so forth. Terminal 101 interacts with call-processing server 103 via a signaling channel to initiate a session to provide a telecommunications service. Terminal 101 uses the Session Initiation Protocol (or "SIP") set of rules to initiate a session. Once a session has been initiated, terminal 101 transmits via telecommunications network 104 session-related traffic, such as voice or data, in packet format to one or more destinations, and also receives, via network 104, session-related traffic from one or more sources. Terminal 101 transmits and receives traffic by using the Internet Protocol set of rules and, as such, is an Internet Protocol-based terminal that is capable of providing Voice over Internet Protocol (or "VoIP") to its user, among other services.

Designated telecommunications terminal 102 is a telecommunications terminal that is capable of exchanging information with call-processing server 103 for the purposes of transmitting or receiving voice or data traffic. Terminal 102 might be a packet-based terminal, similar to terminal 101, or it might be a circuit-based terminal based on older technology, such as a Plain Old Telephone Service (or "POTS") wireline telephone. As part of a call or session, terminal 102 transmits and receives voice and data traffic via what is sometimes referred to as a media channel.

Telecommunications network 104 enables the transport of signaling information, as well as voice and data traffic, between the endpoints (e.g., terminal 101, call-processing server 103, etc.) in telecommunications system 100. Telecommunications network 104 might comprise one or more of the Public Switched Telephone Network, the Internet, one or more dedicated packet-based networks, and so forth. The Public Switched Telephone Network is a complex of telecommunications equipment that is owned and operated by different entities throughout the World. In the United States of America, for example, the Public Switched Telephone Network (or "PSTN") comprises an address space that is defined by ten digits, and, therefore, comprises 10 billion unique addresses or "telephone numbers." The Public Switched Telephone Networks in other countries are similar.

Call-processing server 103 is a private branch exchange that serves an enterprise network and is capable of exchanging signaling information and traffic with terminals 101 and 102. Call-processing server 103 is capable of switching incoming calls (e.g., from terminal 105, etc.) from telecommunications network 104 via one or more transmission lines to "on-premises" terminals 109 and 110. Call-processing server 103 is also capable of handling outgoing calls from terminals 109 and 110 to telecommunications network 104 via one or more transmission lines.

Call-processing server 103 is capable of also extending an incoming call (e.g., from terminal 105, etc.) to a telephone number of an "off-premises" terminal in telecommunications network 104, in addition to switching the same incoming call to an on-premises terminal within the enterprise area (e.g., an office building, etc.) that is served by server 103. Terminals 109 and 110 are considered to be on-premises terminals with respect to call-processing server 103, while terminal 102 is considered to be an off-premises terminal.

Call-processing server 103 exists in both the address space of telecommunications network 104 and the local address space of server 103's enterprise network, and acts as a "bridge" between the two address spaces. For example, when a calling party places a call to someone served by call-processing server 103, the calling party uses a dialing sequence that includes a telephone number that belongs to, and resides within the address space of, telecommunications network 104. As part of the dialing sequence, the calling party also uses an extension number that allows access to one of the on-premises telecommunications terminals that reside within enterprise-network (i.e., local) address space 112. Note that call-processing server 103 receives the extension number information either as digits that are dialed by the calling party separately from the telephone number or as part of the telephone number (e.g., the last four digits, etc.).

To accomplish the switching of an incoming, enterprise-related call to one of on-premises terminals 109 and 110, and the extending of the call to off-premises terminal 102, call-processing server 103 maintains a table that correlates (i.e., "links") the off-premises telephone number to the on-premises, private branch exchange (PBX) extension. Table 1 depicts a table that illustrates the correlation.

TABLE 1

PBX Extension-to-PSTN Number Database

| On-Premises Telecommunications Terminal | Private Branch Exchange Extension | Telecommunications Network Number |
|---|---|---|
| 109 | 732-555-0102, x11 | 201-555-1236 |
| 110 | 732-555-0102, x12 | 908-555-3381 |
| ... | ... | ... |

As an example, a caller at terminal 105 who wishes to reach the PBX user of terminal 109 dials the PBX number (i.e., 732-555-0102). Call-processing server 103 receives the incoming call, including the extension number (i.e., x11).

Using information that is stored in memory and similar to what is shown in Table 1, call-processing server 103 determines that the call is also to be extended to off-premises telephone number 201-555-1236. The off-premises number corresponds to the off-premises terminal (e.g., a cellular phone, a home phone, etc.) that belongs to the PBX user of terminal 109, which is terminal 102 in this example. The idea behind transmitting the call to both terminal 109 and 102 is that if the PBX user is unreachable at his office phone (i.e., terminal 109), then he might be reachable at a phone that is outside of the office (i.e., terminal 102).

The softphone functionality of designating telecommunications terminal 101 enables its user to designate an endpoint in telecommunications system 100, such as designated telecommunications terminal 102, as having one or more privileges. One example of a privilege is handling all calls that are made to the user. The reason why a softphone user might want to designate a different terminal than the softphone to handle calls is because the other terminal, for example, (i) offers better quality, (ii) is functionally more capable, or (iii) has greater reliability than the user's laptop (i.e., terminal 101). To designate terminal 102 to be the recipient of calls, the user enters the address of terminal 102 (e.g., a telephone number, an Internet Protocol address, etc.) on his laptop, and the softphone application transmits the user request to call-processing server 103. Drawing on the earlier example, the PBX user that is associated with on-premises telecommunications terminal 109 would enter "201-555-1236" as the address of terminal 102 (i.e., the corresponding off-premises terminal that is being designated).

SUMMARY OF THE INVENTION

The present invention addresses a problem scenario that occurs when a caller dials the telephone number of an organization, such as a business. As an example, a calling customer needs technical support and calls the organization's tech support hotline. The person who is associated with the called number, a tech support rep, is away from the office on business travel and has elected to have his incoming calls extended to an off-premises telephone number. The off-premises number, however, happens to be that of the switchboard of the hotel at which he is staying. Meanwhile, the calling customer does not actually know the name of the tech support rep who is supposed to receive the call. The problem is that the call cannot be put through if the caller does not know the name of the person to receive the call and, consequently, does not know how to specify to the switchboard operator how to direct the call. The tech support rep, in specifying the off-premises number to his enterprise system, was unable to account for the hotel room extension that is accessible only through the switchboard.

An illustrative embodiment of the present invention enables a call-processing server to extend a received call out to a telecommunications terminal, wherein the telecommunications terminal, such as a hotel room phone, is local to and accessible only through an intermediate point, such as a hotel switchboard. Although two illustrative embodiments are disclosed in this specification, it is the second illustrative embodiment that is applicable to extending a call to a telecommunications terminal endpoint that is in the local address space accessible only by the intermediate point.

In accordance with the second illustrative embodiment, the user of a first terminal (e.g., a softphone implemented on a laptop or notebook computer, etc.) registers with a call-processing server and designates a second terminal (e.g., a hotel room telephone, etc.) to receive traffic (e.g., voice traffic, data traffic, text messages, etc.) that is intended for the user. The user designates the second terminal by specifying a first address (e.g., the main telephone number of a hotel, etc.) and a second address (e.g., the particular hotel room extension, etc.). Later, a caller attempts to call the user of the first terminal, and the call is initially routed to the server with which the user is associated. In response, the server enlists an interactive voice response (IVR) system to call an intermediate point by using the designated telephone number specified in the first address. The IVR system indicates to the answering party (e.g., a hotel operator, etc.) at the intermediate point that a caller is attempting to reach the user at the designated extension specified in the second address. The IVR system then removes itself from the call flow, the call-processing server puts the call through to the intermediate point, and the answering party at the intermediate point puts the call through to the user.

The second illustrative embodiment is advantageous over some techniques in the prior art because the extending of a call to an endpoint with controlled access is made transparent to a caller. For example, if a customer calls a technical support center and the call is routed to a support person who is currently staying at a hotel, the call can be put through to the support person's hotel room without any intervention on the part of the caller.

Also provided by the second illustrative embodiment is the capability of determining whether or not to grant privileges to the second terminal. To determine whether or not to grant a privilege, the call-processing server provides a first signal to the first terminal via a signaling channel, wherein the first signal represents information that requires an action by the user. Using the second terminal and before an actual call is put through to the second terminal, the user provides back to the aforementioned IVR system a second signal that has some relationship to the first signal. If the second signal compares satisfactorily to the first signal, the IVR system notifies the call-processing server, the IVR system removes itself from the call flow, and the call-processing server bridges subsequent calls to the user on the second terminal.

The second illustrative embodiment demonstrates both (i) extending an incoming call to an endpoint that is within the local address space of an intermediate point and (ii) determining whether or not to grant privileges to the endpoint. As those who are skilled in the art will appreciate, the apparatus and methods that are taught in this disclosure can be used for extending the incoming call to the endpoint independently of or in the absence of determining whether or not to grant privileges to the endpoint.

An illustrative embodiment of the present invention comprises: receiving a call to a first telephone number at a server; determining that the call is to be directed to a second telephone number, wherein the second telephone number comprises: (i) a first address that is inside the address space of the Public Switched Telephone Network, and (ii) a second address that is outside the address space of the Public Switched Telephone Network; calling an intermediate point using the first address; and directing the intermediate point to complete the call using the second address; wherein the second telephone number is linked to the first telephone number at the server.

DETAILED DESCRIPTION

Figure 1:
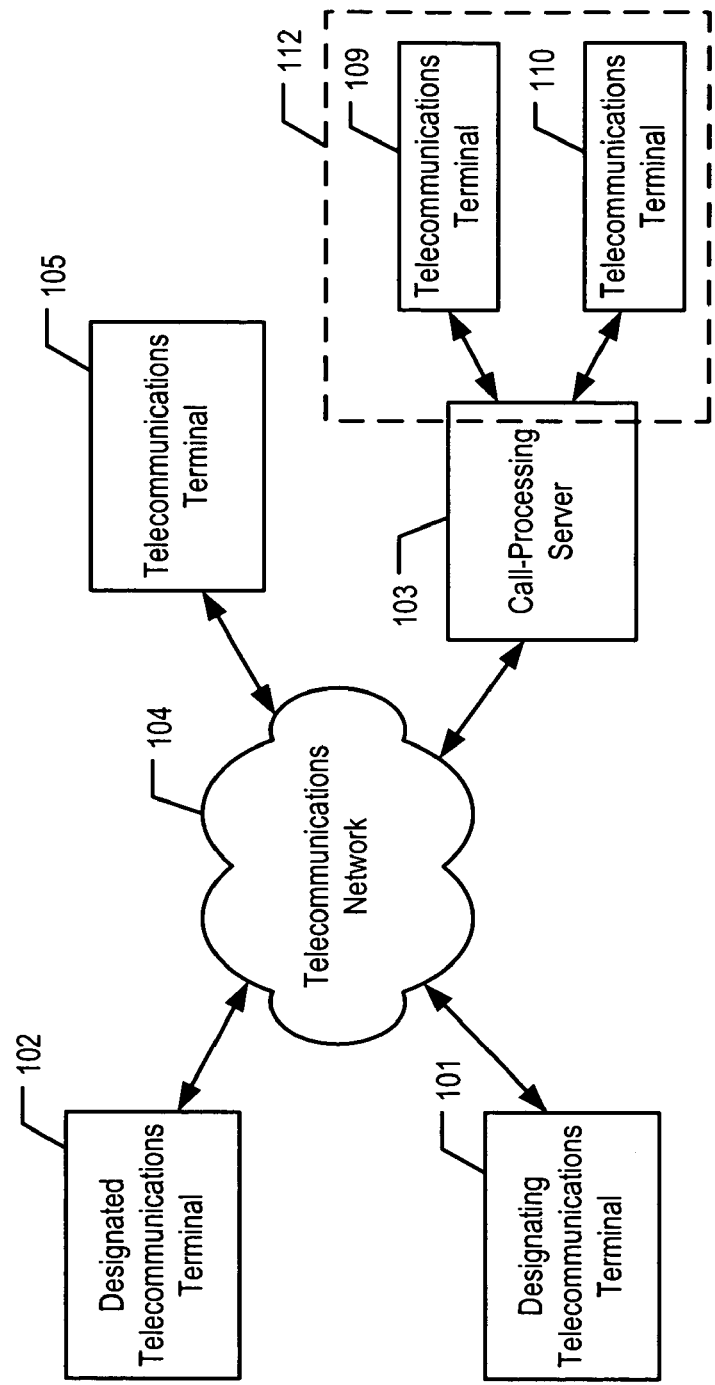
FIG. 1 depicts a block diagram of telecommunications system 100 in the prior art.
Figure 2:
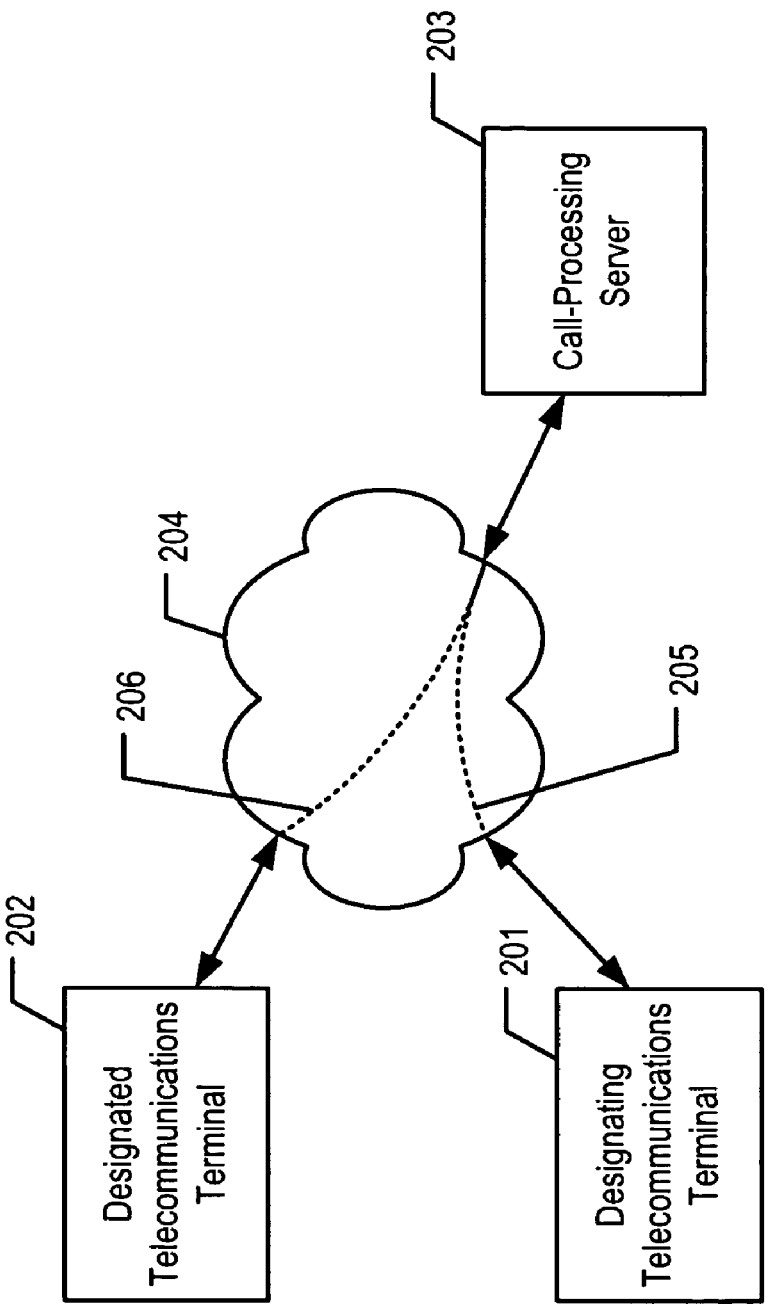
FIG. 2 depicts a block diagram of telecommunications system 200 in accordance with the first illustrative embodiment of the present invention.

FIG. 2 depicts a block diagram of telecommunications system 200 in accordance with the first illustrative embodiment of the present invention. Telecommunications system 200 comprises designating telecommunications terminal 201, designated telecommunications terminal 202, call-processing server 203, and telecommunications network 204, interconnected as shown.

Designating telecommunications terminal 201 is a softphone, as is known in the art, which operates as a portable computer (e.g., a laptop, handheld personal digital assistant [PDA], etc.). Some of the telecommunications services that terminal 201 provides include placing and receiving calls, emailing, instant messaging, and so forth. Terminal 201 interacts with call-processing server 203 to initiate a session to provide a telecommunications service. In some embodiments, terminal 201 interacts with call-processing server 203 via a first communications channel (e.g., signaling channel 205, etc.). For example, terminal 201 can be a signaling endpoint, as is known in the art. Terminal 201 communicates signaling information to call-processing server 203 via the Session Initiation Protocol (SIP). In some alternative embodiments, terminal 201 might communicate with call-processing server 203 via a different protocol (e.g., H.323, etc.).

In some embodiments, once a session has been initiated, terminal 201 transmits via telecommunications network 204 session-related traffic, such as voice or data, in a packet format (e.g., via Internet Protocol, etc.) to one or more destinations. Terminal 201 might also receive session-related traffic from one or more sources via telecommunications network 204.

It will be clear to those skilled in the art how to make and use designating telecommunications terminal 201.

Designated telecommunications terminal 202 is a telecommunications terminal that is capable of placing and receiving calls, as well as exchanging traffic (e.g., voice, data, etc.) with other telecommunications terminals via network 204. Terminal 202 is an Internet Protocol-capable terminal that transmits and receives packets of information. Terminal 202 is physically distinct from terminal 201 with an address (e.g., an Internet Protocol address, a telephone number identifier, etc.) different from that of terminal 201, in accordance with the first illustrative embodiment. As part of an initiated session, terminal 202 transmits and receives traffic, via a second communications channel (e.g., media channel 206, etc.) in some embodiments. For example, terminal 202 can be a media endpoint, as is known in the art. In some alternative embodiments, terminal 202 might be another type of terminal, such as a circuit-based terminal (e.g., a Plain Old Telephone Service wireline telephone, etc.). It will be clear to those skilled in the art how to make and use designated telecommunications terminal 202.

Figure 3:
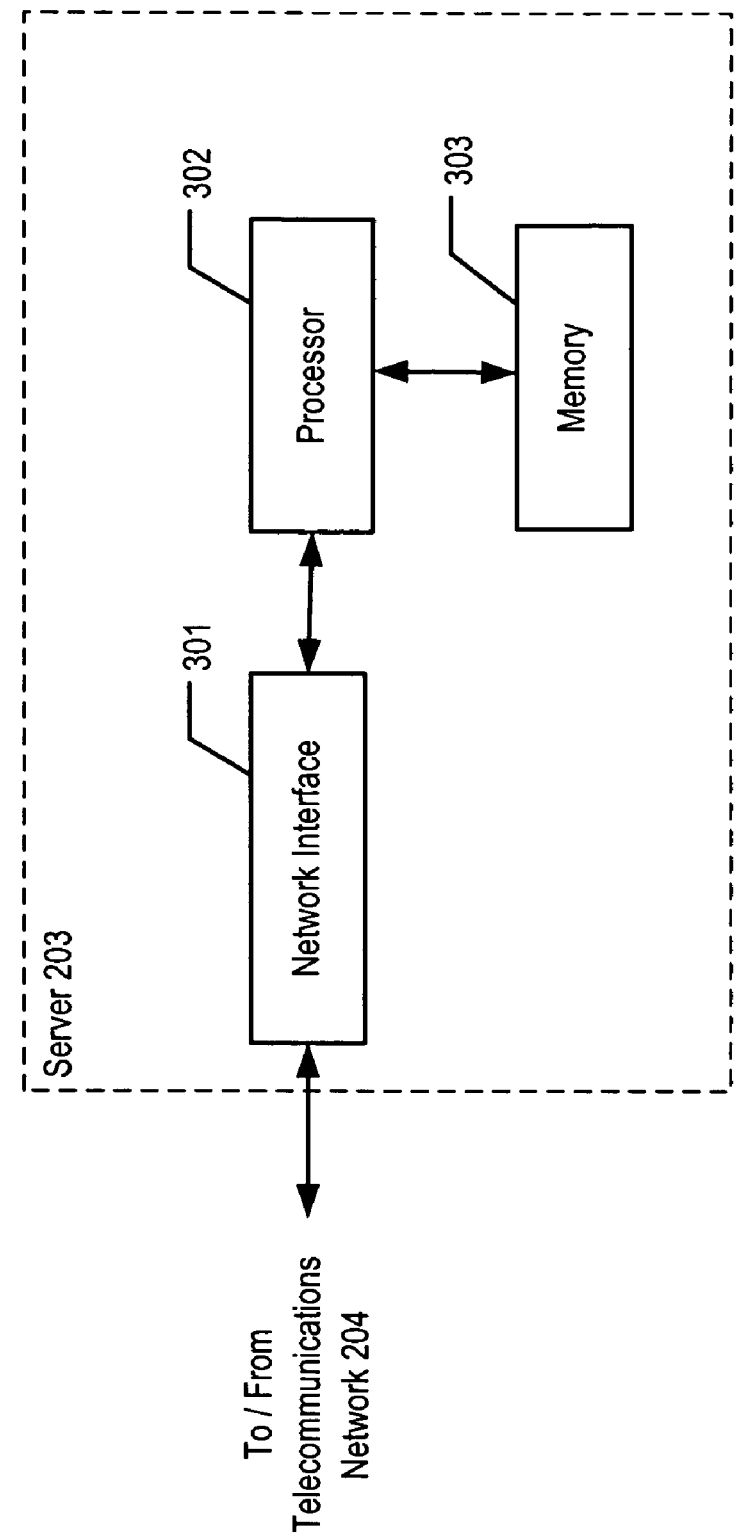
FIG. 3 depicts a block diagram of the salient components of call-processing server 203, in accordance with the first illustrative embodiment of the present invention.

Call-processing server 203 is a data-processing system (e.g., at an office building, at a central office switching center, etc.) that is capable of exchanging signaling information and traffic with terminals 201 and 202. Call-processing server 203's interaction with terminals 201 and 202 is supported by telecommunications network 204, which is equivalent to telecommunications network 104 and, as such, will not be described further. Moreover, call-processing server 203 enables a telecommunications user to designate a telecommunications terminal identifier, such as a telephone number (with or without an extension) or an Internet Protocol address, to which to extend an incoming call. The structure of call-processing server 203 is depicted in FIG. 3.

In accordance with the first illustrative embodiment, call-processing server 203 is capable of exchanging messages to determine whether or not to grant one or more privileges to terminal 202. The tasks that are related to call-processing server 203's interaction with terminals 201 and 202 are described below and with respect to FIGS. 4 and 5. As those who are skilled in the art will appreciate, the functionality of determining whether or not to grant one or more privileges can be alternatively performed somewhere other than at call-processing server 203.

Some alternative embodiments might employ a private branch exchange, as is well-known in the art, in conjunction with call-processing server 203. For example, the private branch exchange might be responsible for accommodating incoming and outgoing voice traffic, leaving call-processing server 203 to handle the specific interactions, described in this disclosure, with the signaling and media channels.

It will be clear to those skilled in the art, after reading this disclosure, how to make and use call-processing server 203.

FIG. 3 depicts a block diagram of the salient components of call-processing server 203, in accordance with the first illustrative embodiment of the present invention. Call-processing server 203 comprises network interface 301, processor 302, and memory 303, interconnected as shown.

Network interface 301 comprises a receiving part and a transmitting part. The receiving part receives signals from telecommunications network 204, and forwards the information encoded in the signals to processor 302, in well-known fashion. The transmitting part receives information from processor 302, and outputs signals that encode this information to telecommunications network 204, in well-known fashion. It will be clear to those skilled in the art how to make and use network interface 301.

Processor 302 is a general-purpose processor that is capable of: receiving information from network interface 301; reading data from and writing data into memory 303; executing the tasks described below and with respect to FIGS. 4 and 5; and transmitting information to network interface 301. In some alternative embodiments of the present invention, processor 302 might be a special-purpose processor. In either case, it will be clear to those skilled in the art, after reading this disclosure, how to make and use processor 302.

Memory 303 stores data and executable instructions, in well-known fashion, and is a combination of volatile and non-volatile memory. It will be clear to those skilled in the art how to make and use memory 303.

Figure 4:
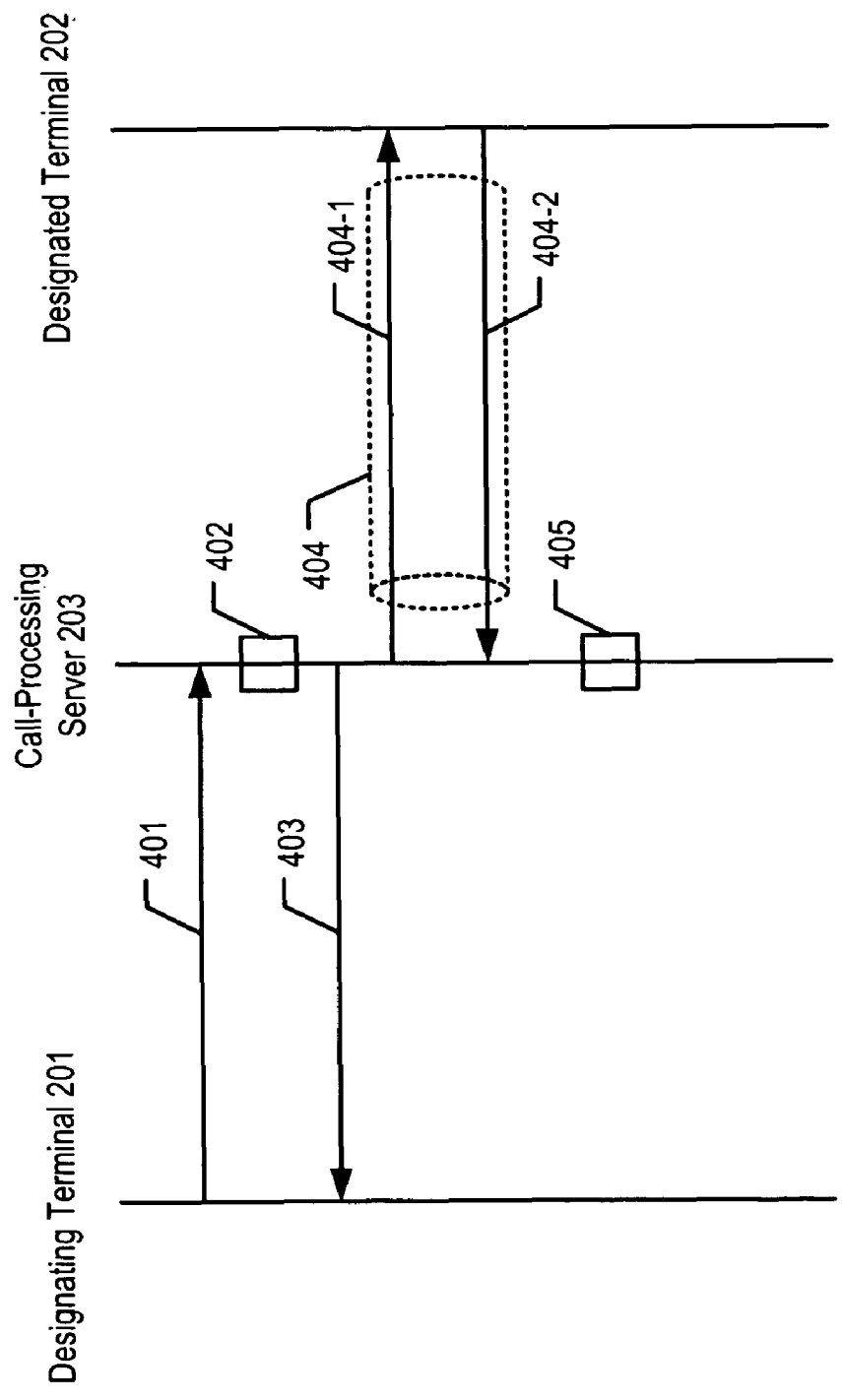
FIG. 4 depicts a first message-flow diagram of the salient events associated with determining whether or not to grant privileges to terminal 202, in accordance with the first illustrative embodiment of the present invention.

FIG. 4 depicts a first message-flow diagram of the salient events associated with determining whether or not to grant privileges to terminal 202, in accordance with the first illustrative embodiment of the present invention. In this message flow, call-processing server 203 provides a first signal to terminal 201 and subsequently expects a second signal from terminal 202. It will be clear to those skilled in the art which events depicted in FIG. 4 can occur simultaneously or in a different order than that depicted.

At event 401, terminal 201 transmits to call-processing server 203 one or more messages that comprise (i) a registration and (ii) a designation of terminal 202 to be granted a privilege (e.g., serving as a media endpoint, etc.), in well-known fashion. For example, terminal 201's user might want to conduct calls by using nearby terminal 202, a telephone that is optimized for voice calls because terminal 202 offers better voice quality than the laptop that serves as terminal 201.

At task 402, server 203 receives the designation of terminal 202 and determines whether or not to validate the relationship of terminals 201 and 202. As those who are skilled in the art will appreciate, the validation can be performed unconditionally, periodically, sporadically, based on terminal 201, based on terminal 202, and so forth.

At task 403, upon deciding to validate the relationship of terminals 201 and 202, server 203 transmits a first signal to terminal 201 on a first communications channel. In accordance with the first illustrative embodiment, the first communications channel is a signaling channel. The first signal comprises information that will be used to determine whether or not to grant privileges, such as allowing terminal 202 to be a media endpoint for future calls. In accordance with the first illustrative embodiment of the present invention, the first signal is less easily read by a machine (e.g., terminal 201, etc.) than a second signal to be provided by the user through terminal 202. For example, the first signal can comprise non-machine-readable information, such as that which is used for on-line registration or purchasing where a distorted or partially-obscured (but human-readable) image of a word is presented to the user, in well-known fashion; the user must then type in the word for verification. Server 203, in some embodiments, also provides instructions via the signaling channel for the user of terminal 202 to follow. For example, text-based instructions might specify inputting, using the terminal 202's keypad, the word that appears in the image presented to terminal 201.

Meanwhile, server 203 also initiates session 404 with terminal 202 in well-known fashion. At event 404-1, server 203 alerts terminal 202 of the session being set up on a second communications channel. In accordance with the first illustrative embodiment, the second communications channel is a media channel. Server 203 also provides instructions on the media channel for the user of terminal 202 to follow. For example, the audio-based instructions might specify inputting, using the terminal 202's keypad, the word that appears in the image presented to terminal 201.

At event 404-2, terminal 202 transmits on the media channel a second signal. The second signal comprises information provided by the user at terminal 202. For example, if the first signal received by terminal 201 comprises a distorted image of the word "elephant", the user of terminal 202 would indicate (e.g., via terminal 202's keypad, via speaking into terminal 202's microphone, etc.) that the received word is "elephant". If the user enters a response via the keypad, terminal 202 transmits the second signal as one or more dual tone multi-frequency signals (i.e., "touch tones").

At task 405, server 203 receives the second signal in well-known fashion. In accordance with the first illustrative embodiment of the present invention, server 203 then determines whether or not to grant one or more privileges to terminal 202 based on the relationship of the first signal to the second signal. Continuing with the example presented above, if the transmitted first signal comprises an image of the word "elephant" and the received second signal comprises an indication that the terminal 202's user understood the word to be "elephant", then server 203 grants the privilege, such as allowing terminal 202 to place calls or to receive calls, or both. If, however, the received second signal indicates an incorrect word or if no second signal was received, then server 203 does not grant the privilege.

Figure 5:
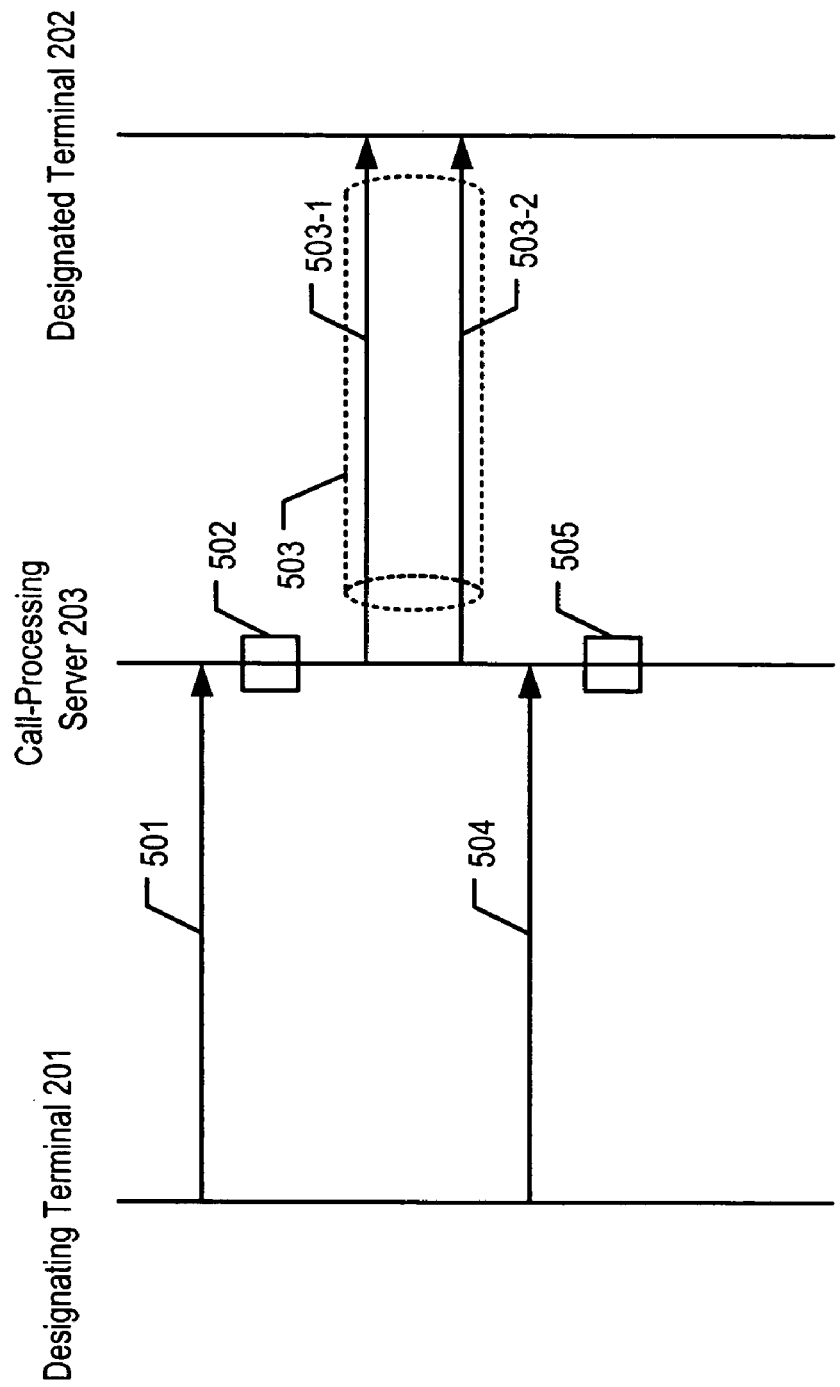
FIG. 5 depicts a second message-flow diagram of the salient events associated with determining whether or not to grant privileges to terminal 202, in accordance with the first illustrative embodiment of the present invention.

FIG. 5 depicts a second message-flow diagram of the salient events associated with determining whether or not to grant privileges to terminal 202, in accordance with the first illustrative embodiment of the present invention. In this message flow, call-processing server 203 provides a first signal to terminal 202 and subsequently expects a second signal from terminal 201. It will be clear to those skilled in the art which events depicted in FIG. 5 can occur simultaneously or in a different order than that depicted.

At event 501, terminal 201 transmits to call-processing server 203 one or more messages that comprise (i) a registration and (ii) a designation of terminal 202 to be granted a privilege (e.g., serving as a media endpoint, etc.), in well-known fashion. For example, terminal 201's user might want to conduct calls by using nearby terminal 202, a telephone that is optimized for voice calls because terminal 202 offers better voice quality than the laptop that serves as terminal 201.

At task 502, server 203 receives the designation of terminal 202 and determines whether or not to validate the relationship of terminals 201 and 202. As those who are skilled in the art will appreciate, the validation can be performed unconditionally, periodically, sporadically, based on terminal 201, based on terminal 202, and so forth.

At task 503, upon deciding to validate the relationship of terminals 201 and 202, server 203 initiates session 503 with terminal 202 in well-known fashion. At event 503-1, server 203 alerts terminal 202 of the session being set up on a media channel. Server 203 also provides instructions on the media channel for the user of terminal 202 to follow.

At event 503-2, server 203 then transmits a first signal to terminal 202 on the media channel. The first signal comprises information that will be used to determine whether or not to grant privileges, such as allowing terminal 202 to be a media endpoint for future calls.

At event 504, terminal 201 transmits on the signaling channel a second signal. The second signal comprises information provided by the user of terminals 201 and 202. For example, if the first signal received by terminal 202 comprises a distorted image of the word "elephant", the user of terminal 201 would indicate (e.g., via terminal 201's laptop keyboard, etc.) that the received word is "elephant".

At task 505, server 203 receives the second signal in well-known fashion. In accordance with the first illustrative embodiment of the present invention, server 203 then determines whether or not to grant one or more privileges to terminal 202 based on the relationship of the first signal to the second signal. Continuing with the example presented above, if the transmitted first signal comprises an image of the word "elephant" and the received second signal comprises an indication that the terminal 202's user understood the word to be "elephant", then server 203 grants the privilege, such as allowing terminal 202 to place calls or to receive calls, or both. If, however, the received second signal indicates an incorrect word or if no second signal was received, then server 203 does not grant the privilege.

Figure 6:
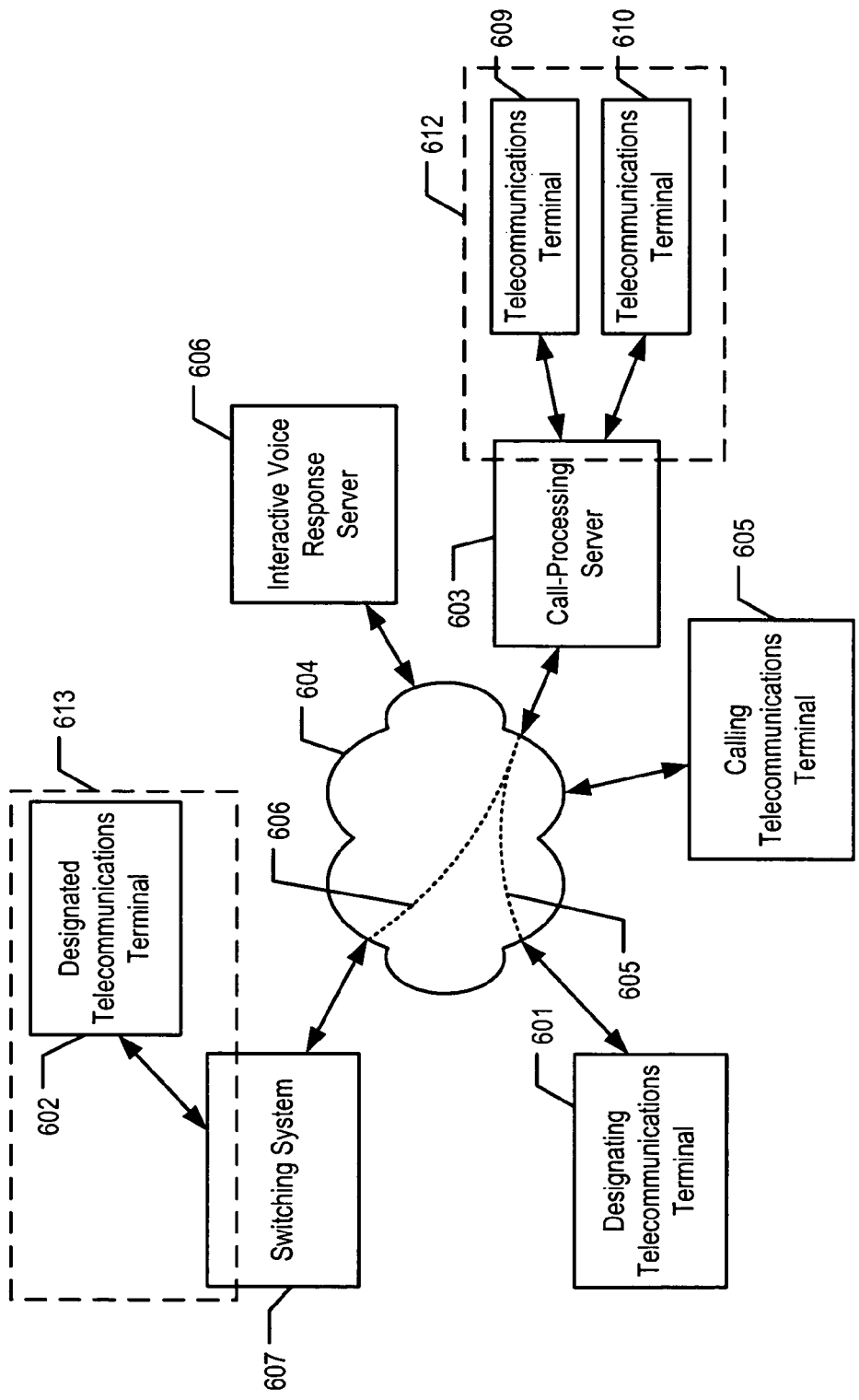
FIG. 6 depicts a block diagram of telecommunications system 600 in accordance with the second illustrative embodiment of the present invention.

FIG. 6 depicts a block diagram of telecommunications system 600 in accordance with the second illustrative embodiment of the present invention. Telecommunications system 600 comprises designating telecommunications terminal 601, designated telecommunications terminal 602, call-processing server 603, telecommunications network 604, calling telecommunications terminal 605, interactive voice response server 606, and switching system 607, interconnected as shown.

Designating telecommunications terminal 601 is a softphone, as is known in the art, which operates as a portable computer (e.g., a laptop, handheld personal digital assistant [PDA], etc.). Some of the telecommunications services that terminal 601 provides include placing and receiving calls, emailing, instant messaging, and so forth. Terminal 601 interacts with call-processing server 603 to initiate a session to provide a telecommunications service. In some embodiments, terminal 601 interacts with call-processing server 603 via a signaling channel (e.g., signaling channel 605, etc.). For example, terminal 601 can be a signaling endpoint, as is known in the art. Terminal 601 communicates signaling information to call-processing server 603 via the Session Initiation Protocol (SIP). In some alternative embodiments, terminal 601 might communicate with call-processing server 603 via a different protocol (e.g., H.323, etc.).

In some embodiments, once a session has been initiated, terminal 601 transmits via telecommunications network 604 session-related traffic, such as voice or data, in a packet format (e.g., via Internet Protocol, etc.) to one or more destinations. Terminal 601 might also receive session-related traffic from one or more sources via telecommunications network 604.

It will be clear to those skilled in the art how to make and use designating telecommunications terminal 601.

Designated telecommunications terminal 602 is a telecommunications terminal that is capable of placing and receiving calls, as well as exchanging traffic (e.g., voice, data, etc.) with other telecommunications terminals via switching system 607 and network 604. Terminal 602 is an Internet Protocol-capable terminal that transmits and receives packets of information. Terminal 602 is physically distinct from terminal 601 with an address (e.g., an Internet Protocol address, a telephone number identifier, etc.) different from that of terminal 601, in accordance with the first illustrative embodiment. As part of an initiated session, terminal 602 transmits and receives traffic, via a media channel (e.g., media channel 606, etc.) in some embodiments. For example, terminal 602 can be a media endpoint, as is known in the art. In some alternative embodiments, terminal 602 might be another type of terminal, such as a circuit-based terminal (e.g., a Plain Old Telephone Service wireline telephone, etc.). It will be clear to those skilled in the art how to make and use designated telecommunications terminal 602.

Call-processing server 603 is a data-processing system (e.g., at an office building, at a central office switching center, etc.) that is capable of exchanging signaling information and traffic with terminals 601 and 602. Call-processing server 603's interaction with terminals 601 and 602 is supported by telecommunications network 604, which is equivalent to telecommunications network 104 and, as such, will not be described further. Call-processing server 603 is also capable of exchanging signaling information and traffic with interactive voice response server 606 via network 604, in well-known fashion.

Figure 7:
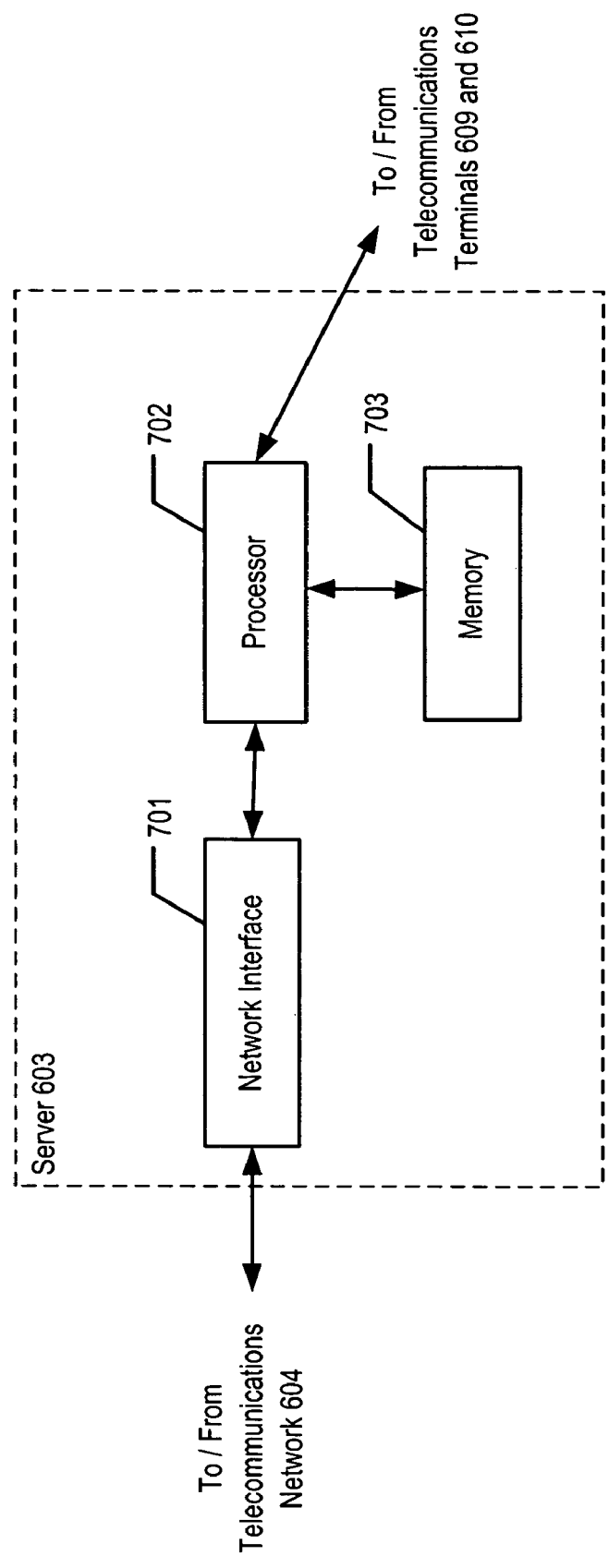
FIG. 7 depicts a block diagram of the salient components of call-processing server 603, in accordance with the second illustrative embodiment of the present invention.

In accordance with the second illustrative embodiment, call-processing server 603 is capable of routing incoming calls (e.g., from terminal 605, etc.) from telecommunications network 604 via one or more transmission lines to on-premises terminals (e.g., telecommunications terminals 609 and 610, etc.) that are within the enterprise-network address space served by server 603. Call-processing server 603 is also capable of handling outgoing calls from terminals (e.g., telecommunications terminals 609 and 610, etc.) that are within the enterprise network to telecommunications network 604 via one or more transmission lines. Moreover, call-processing server 603 enables a telecommunications user to designate a telecommunications terminal identifier, such as a telephone number (with or without an extension) or an Internet Protocol address, to which to extend an incoming call. The structure of call-processing server 603 is depicted in FIG. 7. In some embodiments, call-processing server 603 handles the incoming calls, outgoing calls, and extending of calls as part of private branch exchange functionality.

Call-processing server 603 exists in both the address space of telecommunications network 604 and the local address space of the enterprise network served by server 603, and acts as a "bridge" between the two address spaces. For example, when a calling party places a call to someone served by call-processing server 603, the calling party uses a dialing sequence that includes a telephone number that belongs to, and resides within the address space of, telecommunications network 604. As part of the dialing sequence, the calling party also uses an extension number that allows access to one of the on-premises telecommunications terminals (e.g., terminals 609 and 610, etc.) that reside within enterprise-network (i.e., local) address space 612.

Call-processing server 603, in accordance with the second illustrative embodiment, is also capable of exchanging messages to determine whether or not to grant one or more privileges to terminal 602. The tasks that are related to call-processing server 603's interaction with terminals 601 and 602 are described below and with respect to FIG. 9. As those who are skilled in the art will appreciate, the functionality of determining whether or not to grant one or more privileges can be alternatively performed somewhere other than call-processing server 603.

Some alternative embodiments might employ a private branch exchange, as is well-known in the art, in conjunction with call-processing server 603. For example, the private branch exchange might be responsible for accommodating incoming and outgoing voice traffic, leaving call-processing server 603 to handle specific interactions, described in this disclosure, with the signaling and media channels.

It will be clear to those skilled in the art, after reading this disclosure, how to make and use call-processing server 603.

Calling telecommunications terminal 605 is capable of placing a call to a user, such as the user of terminal 601, in well-known fashion. It will be clear to those skilled in the art how to make and use terminal 605.

Interactive voice response (IVR) server 606 is a system that provides interactive voice response capability, in well-known fashion. IVR server 606 receives signaling information and voice traffic for the purpose of interacting (e.g., receiving selections, etc.) with a person, such as a telecommunications terminal user or a telephone operator associated with switching system 607. IVR server 606 presents (or "speaks") one or more menus or announcements to the person and receives input from the person (e.g., speech signals, keypad input, etc.). IVR server 606 transmits data back to call-processing server 603 in response to and based on the received selections, in accordance with the second illustrative embodiment of the present invention. It will be clear to those skilled in the art, after reading this disclosure, how to make and use interactive voice response server 606.

Switching system 607, an intermediate point, handles incoming and outgoing calls for a particular facility (e.g., a hotel building, etc.) and for one or more telecommunications terminals at that facility (e.g., terminal 602, etc.). In accordance with the second illustrative embodiment of the present invention, switching system 607 is a private branch exchange with a switchboard that is staffed by an operator. In some alternative embodiments, switching system 607 is a call-processing system that automatically switches calls, for example, by answering an incoming call and prompting for the endpoint identifier (e.g., room extension, etc.) of the party to be reached. It will be clear to those skilled in the art how to make and use switching system 607.

Switching system 607 serves an enterprise network (e.g., that of a hotel building, etc.) for the purpose of providing telecommunications service for one or more endpoints (e.g., terminal 602, etc.) that exist within the local address space of the network served by system 607. Switching system 607 exists in both the address space of telecommunications network 604 and the local address space of the enterprise network served by system 607, and acts as a "bridge" between the two address spaces. The local address space of the network that is served by system 607 (i.e., address space 613) is different than that of telecommunications network 604 (i.e., Public Switched Telephone Network [PSTN] address space if network 604 comprises the PSTN) or that of the network served by server 603 (i.e., address space 612). System 607's network, for example, has its own set of hotel room phone extensions, network 604 has its own set of addresses (e.g., 10-digit telephone numbers, etc.), and server 603's network has its own set of office phone extensions.

As an example of how switching system 607 works, when a calling party directly dials system 607 for the purpose of calling someone served by system 607, the calling party must use a dialing sequence that includes a first address that is an identifier of system 607. The first address belongs to, and resides within the address space of, telecommunications network 604 (e.g., a 10-digit telephone number, etc.). As part of the dialing sequence, the calling party also specifies a second address that is an endpoint identifier (e.g., a telephone extension number, etc.); the second address allows access to one of the on-premises telecommunications terminals (e.g., terminal 602, etc.) that reside within enterprise-network (i.e., local) address space 613. System 607, as an intermediate point, uses the second address to put the call through to the endpoint.

FIG. 7 depicts a block diagram of the salient components of call-processing server 603, in accordance with the second illustrative embodiment of the present invention. Call-processing server 603 comprises network interface 701, processor 702, and memory 703, interconnected as shown.

Network interface 701 comprises a receiving part and a transmitting part. The receiving part receives signals from telecommunications network 604, and forwards the information encoded in the signals to processor 702, in well-known fashion. The transmitting part receives information from processor 702, and outputs signals that encode this information to telecommunications network 604, in well-known fashion. It will be clear to those skilled in the art how to make and use network interface 701.

Processor 702 is a general-purpose processor that is capable of: receiving information from network interface 701; reading data from and writing data into memory 703; executing the tasks described below and with respect to FIG. 9; and transmitting information to network interface 701. Processor 702 also exchanges information with one or more telecommunications terminals (e.g., terminals 609 and 610, etc.), in well-known fashion. In some alternative embodiments of the present invention, processor 702 might be a special-purpose processor. For example, processor 702 might comprise switching fabric with which to switch calls between telecommunications network 604 and one or more terminals, such as terminals 609 and 610. Alternatively, the switching fabric, if present, might be situated outside of processor 702 within call-processing server 603. In any case, it will be clear to those skilled in the art, after reading this disclosure, how to make and use processor 702.

Memory 703 stores data and executable instructions, in well-known fashion, and is a combination of volatile and non-volatile memory. It will be clear to those skilled in the art how to make and use memory 703.

Figure 8:
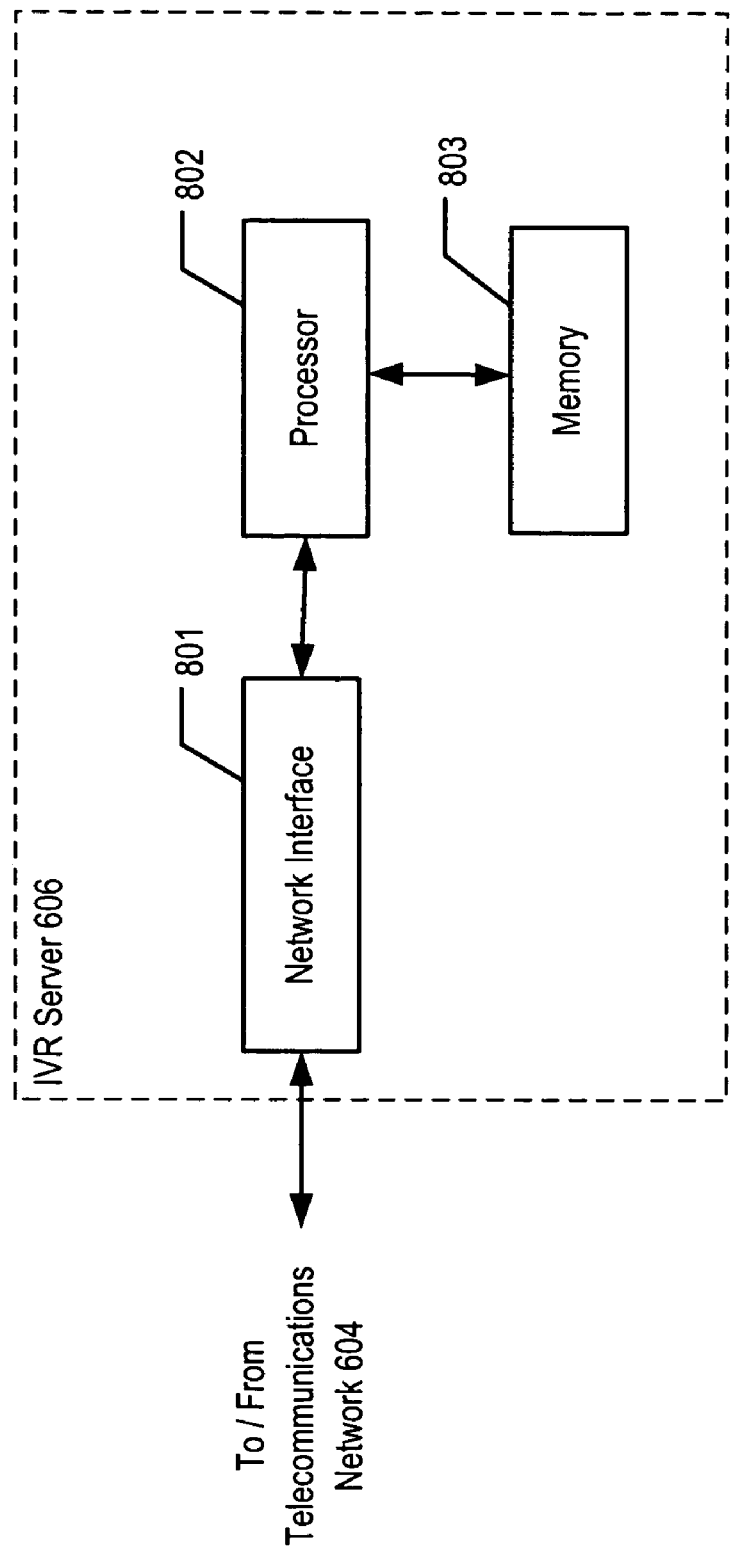
FIG. 8 depicts a block diagram of the salient components of interactive voice response server 606, in accordance with the second illustrative embodiment of the present invention.

FIG. 8 depicts a block diagram of the salient components of interactive voice response server 606, in accordance with the second illustrative embodiment of the present invention. Interactive voice response server 606 comprises network interface 801, processor 802, and memory 803, interconnected as shown.

Network interface 801 comprises a receiving part and a transmitting part. The receiving part receives signals from telecommunications network 604, and forwards the information encoded in the signals to processor 802, in well-known fashion. The transmitting part receives information from processor 802, and outputs signals that encode this information to telecommunications network 604, in well-known fashion. It will be clear to those skilled in the art how to make and use network interface 801.

Processor 802 is a general-purpose processor that is capable of: receiving information from network interface 801; reading data from and writing data into memory 803; executing the tasks described below and with respect to FIG. 9; and transmitting information to network interface 801. In some alternative embodiments of the present invention, processor 802 might be a special-purpose processor. In either case, it will be clear to those skilled in the art, after reading this disclosure, how to make and use processor 802.

Memory 803 stores data and executable instructions, in well-known fashion, and is a combination of volatile and non-volatile memory. It will be clear to those skilled in the art how to make and use memory 803.

Figure 9:
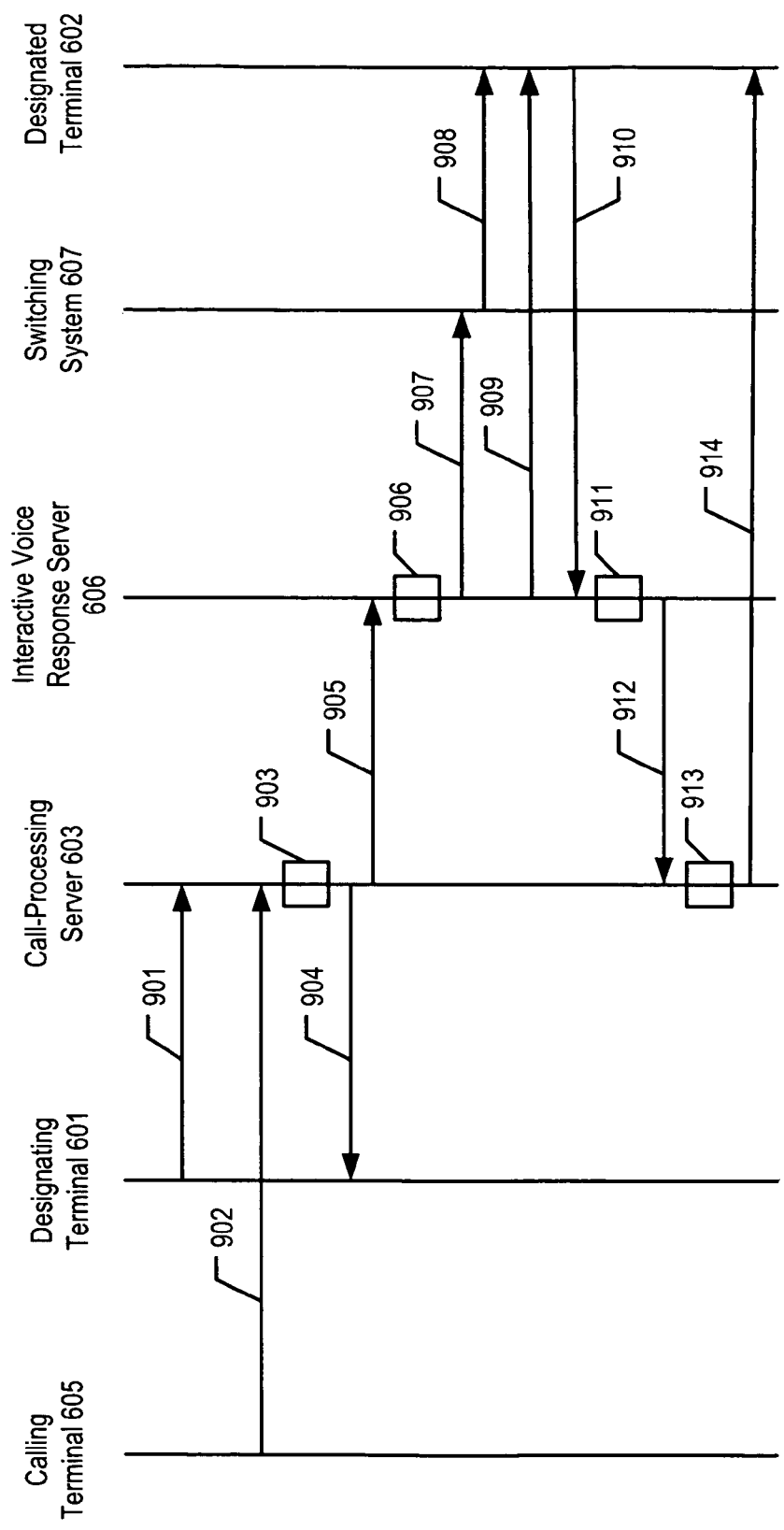
FIG. 9 depicts a message-flow diagram of the salient events associated with extending a call, as well determining whether or not to grant privileges, to terminal 602, in accordance with the second illustrative embodiment of the present invention.

FIG. 9 depicts a message-flow diagram of the salient events associated with extending a call, as well determining whether or not to grant privileges, to terminal 602, in accordance with the second illustrative embodiment of the present invention. It will be clear to those skilled in the art which events depicted in FIG. 9 can occur simultaneously or in a different order than that depicted.

In the example that is depicted in FIG. 9, a telecommunications user has the capability through call-processing server 603 to have calls that are made to her office telephone number extended to a designated telephone number or other address (e.g., an Internet Protocol address, etc.) outside the office. In this example, the user is currently staying at a hotel and wishes to designate the telephone in her hotel room to receive the calls that are made to her office telephone number. The room telephone, however, does not have a directly dialed number; instead, all incoming calls to the room telephone have to be switched through switching system 607 by the hotel operator. The user has brought along her laptop, which supports a softphone function and is represented in FIG. 9 as terminal 601. Terminal 601 is able to communicate in part via the hotel's local area network (e.g., a WiFi network, etc.). Terminal 602 represents the room telephone. Call-processing server 603 is the data-processing system that serves the user's office building, including her office telephone. Interactive voice response server 606 is also associated with server 603 and the office building.

At event 901, terminal 601 transmits to call-processing server 603 one or more messages that comprise (i) a registration and (ii) a designation of terminal 602 to be granted a privilege (e.g., serving as a media endpoint, etc.), in well-known fashion. Server 603 receives the following information that identifies terminal 602:

(i) a first address that is an identifier of system 607 (i.e., an intermediate point identifier), which is illustrated in the example by a telephone number (e.g., a 10-digit number in North America, etc.) that routes to the hotel private branch exchange (i.e., system 607); and (ii) a second address that is an endpoint identifier of terminal 602, which is illustrated in the example by a telephone extension that corresponds to the user's room phone at the hotel. The endpoint identifier exists within the local address space of system 607 (and outside the address space of network 604).

Terminal 601's user invokes this message flow for the purpose of conducting calls on nearby terminal 602, which is a hotel room telephone that is optimized for voice calls and that offers better voice quality than the user's laptop softphone of terminal 601.

Server 603 stores (i) the intermediate-point identifier and (ii) the endpoint identifier into the user's database. Server 603 also correlates (i.e., "links") the stored identifiers to the corresponding on-premises terminal identifier (e.g., the telephone number of terminal 610, etc.). The correlation is important in that whenever server 603 receives an incoming call, server 603 will receive a called-party identifier as part of the call. The called-party identifier will identify the particular on-premises terminal (and user) being called. Server 603 will then check in the user's database to see if there is (i) an intermediate-point identifier and (ii) and endpoint identifier that are linked to the called-party identifier.

At event 902, which occurs independently of event 901 and possibly a relatively long time later (e.g, hours later, etc.), calling telecommunications terminal 605's user places a call to the office telephone number (i.e., the called-party identifier) of terminal 602's user. In the example, the office telephone number is the telephone number of terminal 610. As a result, network 604 routes the call to call-processing server 603, in well-known fashion. In some alternative embodiments, terminal 605's user places a call to a general telephone number (e.g., a technical support hotline, etc.), and call-processing server 603 routes the call to the office telephone number of terminal 602's user.

At task 903, server 603 receives the incoming call and a called-party identifier as part of the call, checks the user's database, and determines that the user has registered (i) an intermediate-point identifier, and (ii) an endpoint identifier that corresponds to terminal 602 and that requires the invention of an intermediate point (i.e., system 607). As those who are skilled in the art will appreciate, server 603 determines that intervention will be required to reach terminal 602 because of the presence of an extension (in addition to a telephone number) in the user's database. Because the incoming call is intended for terminal 602, server 603 decides to It optionally validate the relationship of terminals 601 and 602.

will be clear to those skilled in the art how to determine when to validate the relationship of the two terminals, as described earlier and with respect to FIGS. 4 and 5.

Call-processing server 603, at task 903, also puts the incoming call on hold until server 603 is either ready to: (i) extend the call to switching system 607, or (ii) provide other treatment for the call. As those who are skilled in the art will appreciate, server 603 might play a message, music, or other sounds to calling terminal 605's user.

At event 904, upon deciding to validate the relationship of terminals 601 and 602, server 603 transmits a first signal to terminal 601 on a first communications channel. In accordance with the second illustrative embodiment, the first communications channel is a signaling channel. The first signal comprises information that will be used to determine whether or not to grant privileges, such as allowing terminal 602 to be a media endpoint for future calls to the user. In accordance with the second illustrative embodiment of the present invention, the first signal is less easily read by a machine (e.g., terminal 601, etc.) than a second signal to be provided by the user at terminal 602, as described earlier and with respect to task 403 of FIG. 4. Server 603 also provides instructions via the signaling channel for the user to follow.

In some alternative embodiments, the first signal might be easily read by a machine. For example, in some applications securing terminal 601 from malware or from the effects of malware might not be an issue or might be accomplished through other means.

Meanwhile, at event 905 call-processing server 603 also transmits to IVR server 606: (i) the telephone number of the hotel (i.e., the first address), (ii) the room extension (i.e., the second address), and (iii) optionally, the first signal.

At task 906, IVR server 606 calls switching system 607 in well-known fashion by using the telephone number of the hotel that was provided by call-processing server 603.

At event 907, IVR server 606 announces (i.e., to a hotel operator at switching system 607) that there is an incoming call and provides switching system 607 with the room extension. In other words, IVR server 606 transmits the endpoint identifier to switching system 607 and directs system 607 to forward the call to the endpoint identifier when system 607 receives the call. As those who are skilled in the art will appreciate, IVR server 606 can speak the endpoint identifier, send the endpoint identifier in a data message, or transmit the endpoint identifier in another way.

At event 908, switching system 607 alerts terminal 602 of an incoming call. The user of terminal 602 answers the call, which at this point is only between IVR server 606 and the user of terminal 602.

At event 909, IVR server 606 provides instructions (e.g., audio-based, etc.) for the user of terminal 602 to follow. For example, the instructions might specify inputting, using the terminal 602's keypad, the information provided as part of the first signal transmitted previously to terminal 601.

At event 910, terminal 602 transmits on a second communications channel a second signal. In accordance with the second illustrative embodiment, the second communications channel is a media channel. The second signal comprises information provided by the user of terminals 601 and 602. For example, if the first signal received by terminal 601 comprises a distorted image of the word "elephant", the user of terminal 602 would indicate (e.g., via terminal 602's keypad, via speaking into terminal 602's microphone, etc.) that the received word is "elephant". If the user enters a response via the keypad, terminal 602 transmits the second signal as one or more dual tone multi-frequency signals (i.e., "touch tones").

At task 911, IVR server 606 receives the second signal in well-known fashion. In accordance with the second illustrative embodiment of the present invention, IVR server 606 then determines whether or not the relationship of the first signal (and terminal 601) to the second signal (and terminal 602) is valid. Continuing with the example presented earlier, if the transmitted first signal comprises an image of the word "elephant" and the received second signal comprises an indication that the terminal 602's user understood the word to be "elephant", IVR server 606 determines the relationship to be valid and removes itself from the call flow. If, however, the received second signal indicates an incorrect word or if no second signal was received, then IVR server 606 determines the relationship to be invalid. As those who are skilled in the art will appreciate, in some alternative embodiments, call-processing server 603 can determine the validity of the relationship.

At event 912, IVR server 606 notifies call-processing server 603 of the success or failure in validating the relationship between terminals 601 and 602. IVR server 606 removes itself from the call flow in well-known fashion.

At task 913, call-processing server 603 decides whether or not to allow the call through to terminal 602, based on the validation of the relationship between terminals 601 and 602.

At event 914, call-processing server 603 directs (i.e., "extends") the call through to terminal 602 via switching system 607. In some embodiments, server 603 directs the call only if the relationship between the two terminals (i.e., terminals 601 and 602) has been validated. Task and event execution ends after event 914.

The second illustrative embodiment demonstrates both (i) extending an incoming call to an endpoint that is within the local address space of an intermediate point and (ii) determining whether or not to grant privileges to the endpoint. As those who are skilled in the art will appreciate, the apparatus and methods that are taught in this disclosure can be used for extending the incoming call to the endpoint independently of or in the absence of determining whether or not to grant privileges to the endpoint. For example, in some alternative embodiments, some combination of call-processing server 603 and IVR server 606 can direct switching system 607 to complete the call placed from terminal 605 without concurrently determining whether or not to grant a privilege to terminal 602.

In a variation of the second illustrative embodiment, the tasks and events that are described above and with respect to events 901 through 903 are replaced with the following call flow scenario. As an example, the user of on-premises terminal 609 already knows that her colleague is away from the office at the hotel and wishes to reach her colleague at terminal 602. The user of terminal 609 places a call to terminal 602 by conveniently dialing directly into server 603 a single, uninterrupted string of digits that comprises: (i) a first address that is inside the address space of network 604 (e.g., the Public Switched Telephone Network, etc.) and (ii) a second address that is outside the address space of network 604. The dialed string, which is essentially an extended telephone number, comprises the addressing information needed to reach terminal 602, namely the hotel switchboard number and the room extension. Server 603 receives the dialed digits from terminal 609, checks the dialed digits, and determines that terminal 609's user has dialed enough digits to specify: (i) an intermediate-point identifier and (ii) an endpoint identifier that corresponds to terminal 602. Reaching terminal 602 will require intervention by the intermediate point (i.e., switching system 607). As those who are skilled in the art will appreciate, server 603 determines that the intervention will be required because of the presence of an extension (in addition to a telephone number that is compatible with network 604) in the dialed digits. Because the call is intended for terminal 602, server 603 decides to optionally validate the relationship of terminals 601 and 602. (Terminal 601 has already registered and designated terminal 602, similarly to what was described earlier and with respect to task 901.) It will be clear to those skilled in the art how to determine when to validate the relationship of the two terminals, as described earlier and with respect to FIGS. 4 and 5. Call control then proceeds to event 904, as described earlier.

Referring to the second illustrative embodiment in general, as will be appreciated by those skilled in the art some alternative embodiments might employ only one of processing server 603 and IVR server 606 with the capability of performing the methods depicted in FIG. 9. Furthermore, as will be appreciated by those skilled in the art, some embodiments that are alternative to the illustrative embodiments might also employ a separate private branch exchange (or other data-processing system) to perform the methods depicted in FIGS. 4, 5, and 9. Also, some other alternative embodiments might employ a private branch exchange to perform the methods depicted in FIGS. 4, 5, and 9 without one or any of call-processing server 203/603 and IVR server 606.

It is to be understood that the above-described embodiments are merely illustrative of the present invention and that many variations of the above-described embodiments can be devised by those skilled in the art without departing from the scope of the invention. For example, in this Disclosure, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the disclosure to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Disclosure are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
   receiving, at a server, a request from a first telecommunications terminal to direct calls to a first telephone number to a second telephone number, wherein said second telephone number comprises:
   (i) a first address that is inside the address space of the Public Switched Telephone Network, and
   (ii) a second address that is outside the address space of the Public Switched Telephone Network;
   transmitting to said first telecommunications terminal a first signal;

receiving a second signal from a second telecommunications terminal,
wherein said second telecommunications terminal is associated with said second telephone number, and
wherein said second telecommunications terminal is distinct from said first telecommunications terminal;
when said first signal compares satisfactorily to said second signal, linking said first telephone number to said second telephone number;
receiving, at said server, a call to said first telephone number;
determining that said call is to be directed to said second telephone number;
calling an intermediate point using said first address; and
directing said intermediate point to complete said call using said second address.

2. The method of claim 1 wherein the directing of said intermediate point is accomplished through an interactive voice response system.

3. The method of claim 2 wherein said interactive voice response system speaks said second address to an operator of said intermediate point.

4. The method of claim 1 wherein said second address is within the local address space of said intermediate point.

5. The method of claim 1 wherein said second address comprises a telephone extension.

6. The method of claim 1 wherein the first signal is an indication of location.

7. The method of claim 1 wherein the first signal is an indication of an action taken by an user.

8. The method of claim 7 further comprising determining whether or not to grant said privilege to an endpoint that corresponds to said second address, based on a first signal that is transmitted to said telecommunications terminal and a second signal that is received from said endpoint.

9. A method comprising:
receiving, at a server, a request from a first telecommunications terminal to link a called party identifier to an endpoint identifier
wherein the request is received over a first media channel,
wherein the endpoint identifier exists within the local address space of an intermediate point, and
wherein said called-party identifier exists outside of the local address space of said intermediate point;
transmitting to said first telecommunications terminal a first signal, wherein the first signal is transmitted over the first media channel;
initiating, at the server, a first telecommunications session with a second telecommunications terminal, wherein the second telecommunication session is initiated over a second media channel;
receiving a second signal from the second telecommunications terminal,
wherein the second signal is received as part of the first telecommunications session;
wherein the second signal is received over the second media channel;
wherein said second telecommunications terminal is associated with said end point identifier, and
wherein said second telecommunications terminal is distinct from said first telecommunications terminal;
when said first signal compares satisfactorily to said second signal, linking said called party identifier to said end point identifier;
receiving a call and said called-party identifier as part of said call;
transmitting said endpoint identifier via an interactive voice response system to said intermediate point if said endpoint identifier is linked to said called-party identifier; and
directing said intermediate point to complete said call to said endpoint by using said transmitted endpoint identifier.

10. The method of claim 9 further comprising receiving: (i) the identifier of said intermediate point and (ii) said endpoint identifier, prior to the receiving of said call.

11. The method of claim 9 further comprising determining if said endpoint identifier is linked to said called-party identifier, prior to the transmitting of said endpoint identifier.

12. The method of claim 9 wherein said endpoint identifier comprises a telephone extension.

13. The method of claim 9 further comprising determining whether or not to grant a privilege to said endpoint.

14. The method of claim 13 wherein the determining of whether or not to grant said privilege is based on a first signal that is transmitted to a telecommunications terminal and a second signal that is received from said endpoint, wherein said telecommunications terminal and said endpoint are physically distinct.

15. A method comprising:
receiving, at a server, a request from a first telecommunications terminal to direct calls to a first telephone number to a second telephone number, wherein said second telephone number comprises:
(i) a first address that is inside the address space of the Public Switched Telephone Network, and
(ii) a second address that is outside the address space of the Public Switched Telephone Network;
transmitting to the first telecommunications terminal a first signal, wherein the first signal carries at least one of image and text;
receiving a second signal from the second telecommunications terminal, wherein the second signal is audio signal;
wherein said second telecommunications terminal is associated with said second telephone number, and
wherein said second telecommunications terminal is distinct from said first telecommunications terminal;
when said first signal compares satisfactorily to said second signal, linking said first telephone number to said second telephone number;
receiving-a call to said first telephone number;
calling an intermediate point using said first address; and
directing said intermediate point to complete said call by using said second address.

16. The method of claim 15 wherein the directing of said intermediate point is accomplished through an interactive voice response system.

17. The method of claim 16 wherein said interactive voice response system speaks said second address to an operator of said intermediate point.

18. The method of claim 15 wherein said second address is within the local address space of said intermediate point.

19. The method of claim 15 wherein said second address comprises a telephone extension.

20. The method of claim 15 further comprising determining whether or not to grant a privilege to an endpoint that corresponds to said second address.

* * * * *